Figure 1:
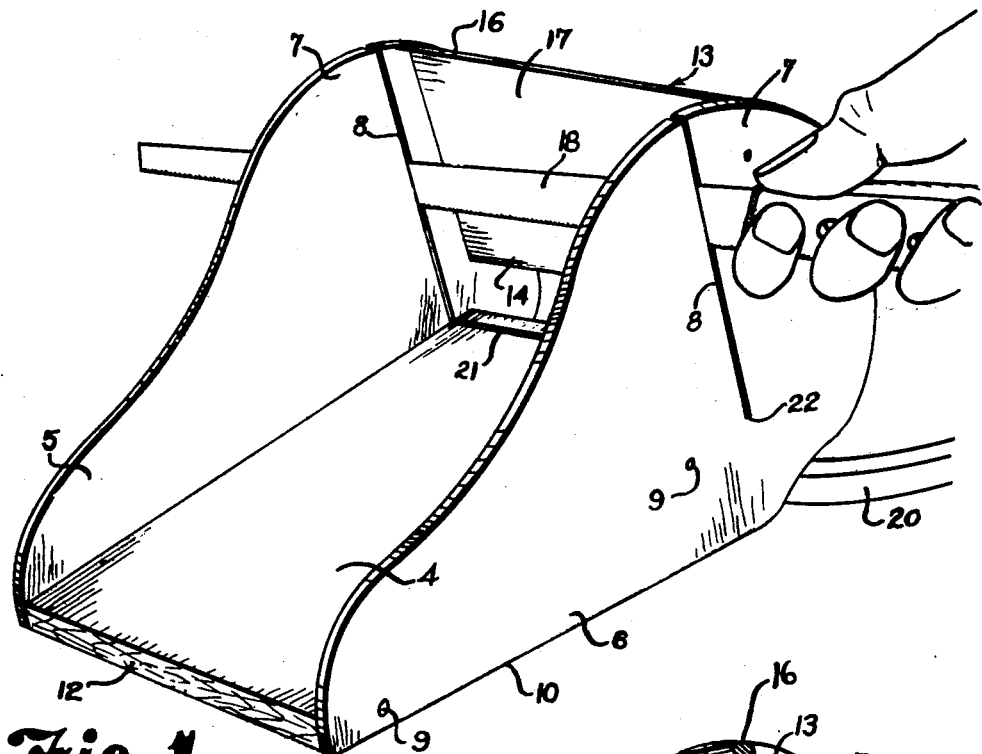

Sept. 17, 1946.   J. R. FUCHS ET AL   2,407,658
SLICING DEVICE
Filed March 1, 1943

INVENTORS
JOHN R. FUCHS
ALFRED R. FUCHS
BY Alfred R. Fuchs
ATTORNEY

Patented Sept. 17, 1946

2,407,658

UNITED STATES PATENT OFFICE 2,407,658

SLICING DEVICE

John R. Fuchs and Alfred R. Fuchs,
Kansas City, Mo.

Application March 1, 1943, Serial No. 477,590

2 Claims. (Cl. 146—150)

Our invention relates to slicing devices, and more particularly to a bread slicing device.

It is a purpose of our invention to provide a device for slicing an article, such as a loaf of bread, into slices of uniform thickness. By uniform thickness is meant not merely slicing the loaf so that each slice is of the same thickness as every other slice, but that the particular slice is of the same thickness throughout its area. In order to accomplish this purpose it is necessary that means be provided that will not only gauge the thickness of the slice, but will serve as means to support the end of the loaf from which the bread is being sliced so that the portion that is being cut off in the slicing operation will remain in position relative to the rest of the loaf, so that there will be no tendency for the thickness of the slice to vary as the cutting implement passes through the loaf. If the portion of the loaf that is being sliced off is not sufficiently supported on its face, as well as on the edge portion thereof, the tendency will be for the slice to taper, usually having a tendency to become thicker, due to the soft character of the loaf of bread, as the last portion to be cut off is reached, as the tendency of the pressure exerted by the knife blade is to squeeze the soft interior of the slice outwardly away from the remainder of the loaf to thus place a greater amount of bread between the knife and the end of the loaf from which the previous slice had been cut, than would be the case if the slice were firmly supported so as to prevent such spreading or squeezing of the material of the slice.

It is a particular purpose of our invention to provide a slicing device of the above mentioned character in which means is provided for discharging slices that have been cut off from the loaf therefrom, by the action of moving the loaf into position to perform the next slicing operation. This is preferably accomplished by providing means for guiding a knife or similar cutting implement spaced from a gauging member in the form of a transverse partition or wall with which the end of the loaf from which the slice is to be cut engages, whether the first slice is being cut from the loaf or slices have already been cut from the loaf, which is inclined so that after the slice has been cut off the loaf, and the knife withdrawn, said slice will drop by gravity into position with its cut face flatly against the bottom wall of the slicing device, upon the uncut part of the loaf being pulled back away from said transverse wall or partition, an opening being provided below said transverse wall or partition, through which said cut off slice is then pushed by means of the uncut portion of the loaf as the uncut portion is slid along the bottom of said slicing device to bring the same into position in contact with the transverse wall constituting the gauging means.

It is a particular purpose of our invention to provide a device of the above mentioned character that is simple and cheap in construction and which is simple in operation so that any ordinary person can use the same to slice bread without requiring any complicated directions for the operation thereof. Furthermore it is a purpose of our invention to provide a device of the above referred to character that can be made of materials that can be readily obtained and which are non-metallic.

Other objects and advantages of our invention will appear as the description of the drawing proceeds. We desire to have it understood, however, that we do not intend to limit ourselves to the particular details shown or described, except as defined in the claims.

In the drawing:

Fig. 1 is a perspective view of the form of our bread slicing device at present preferred, showing the position of the knife relative thereto when slicing is being performed.

Figure 2:
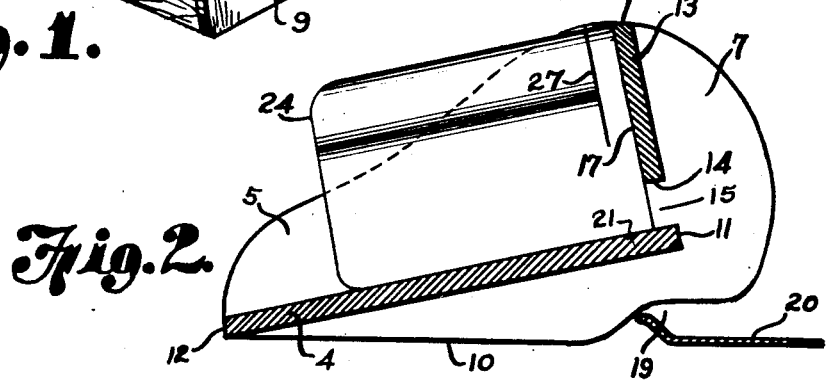
Figure 3:
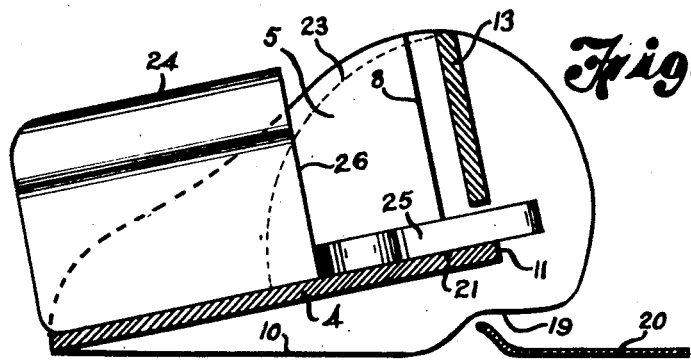

Fig. 2 is a vertical longitudinal sectional view through our improved slicing device diagrammatically showing a loaf of bread in position therein, with a slice partly sliced off, and Fig. 3 is a view similar to Fig. 2 showing the unsliced part of the loaf after having been drawn back from the gauging means and in engagement with the slice that has been cut off, which is in position to be ejected from the device by means of said loaf.

Referring in detail to the drawing, our improved slicing device comprises a bottom member 4, which is preferably made of wood and constitutes the loaf supporting means of the device, any flat side of the loaf being adapted to be placed thereon as may be found to be convenient or desirable for the person operating the slicing device. Said slicing device further comprises the vertical parallel side wall members 5 and 6, preferably having enlarged end portions 7 that are provided with slots 8 therein, said slots 8 extending perpendicularly to the top face of the bottom member 4. Said side members 5 and 6 may be made of plywood or compressed fibrous sheet material, or any other suitable stiff material that will remain in position perpendicular to the bottom member 4 when secured thereto by means of the headed securing elements 9, which are, preferably, nails, although any other means for securing the side walls 5 and 6 to the bottom wall 4 may be used.

It will be noted upon reference to Figs. 2 and 3 that the bottom wall 4 is inclined relative to the bottom edges 10 of the side wall members 5 and 6. Thus when the device is resting on a supporting surface, such as a table, the bottom wall 4 will incline upwardly so that the discharge end 11 thereof will be considerably higher than the forward end 12 thereof, through which the loaf of bread is introduced into the device. A fixed rigid transverse wall or partition 13 is provided, which extends perpendicularly to the bottom wall 4 and which has its bottom transverse edge 14 spaced from the bottom wall 4 to provide an opening or wide slot 15 below said bottom edge 14 for the discharge of the sliced bread therethrough. Due to the fact that the wall 4 is inclined upwardly toward the wall 13 and that said wall 13 is perpendicular to said wall 4, said wall 13 is inclined so that its top end 16 lies considerably forwardly of its bottom end 14, and the forward face 17 thereof is exactly parallel to the plane in which the slots 8 lie and the knife blade 18 will accordingly be guided in a path exactly parallel to the face of said transverse wall or gauging member 13.

The bottom wall 4 also extends beyond the slots 8, and may extend below the partition or transverse wall 13. The side wall members 5 and 6 may be cut away, as shown at 19, so that a plate or other receptacle for the sliced bread can be slipped into position below the bottom wall 4 to receive the sliced bread as it drops off said bottom wall in a manner to be described below.

In order to slice a loaf of bread, the loaf is placed in position with a flat face thereof against the top plane surface of the inclined bottom wall 4 and is slid along said bottom wall 4 until the one end of the loaf engages the flat face 17 of the wall 13. It is immaterial whether a face or faces of the loaf engage with either the wall 5 or the wall 6, although another flat face of the loaf can be engaged with one of said walls, if desired, so as to guide the same toward the flat face 17 of the wall 13. The walls 5 and 6 are, preferably, far enough apart that different size loaves of bread will pass between the same and into engagement with the wall 13, it being unnecessary for the loaf of bread to engage either of the side walls, inasmuch as it will be perfectly guided by means of the bottom wall 4 and the transverse wall 13. After the bread is in position with the end wall thereof in engagement with the flat face 17 of the wall 13 the knife blade 18 is inserted into the top open ends of the slots 8 and the slicing operation is begun, this being, preferably, done by means of a sawing motion and the knife, preferably, having a serrated edge, although slicing can be done with any shape knife as long as a back and forth or sawing motion is used, and no excessive pressure downwardly or the loaf by means of the knife blade is exerted. The loaf must, of course, be held in engagement with the flat face 17 of the wall 13 throughout the operation of cutting off a slice of bread, but no force is necessary to accomplish this, the loaf being merely held lightly in engagement with said wall, as it is, of course, undesirable to compress the bread, particularly if it is fresh. After the slice has been completely cut off, the knife blade is removed from the slots. It will be noted that there is a transverse slot 21 provided in the bottom wall 4 and, preferably, the bottom ends 22 of the slots 8 extend slightly below the top face of the bottom wall 4, so that the serrated edge of the knife blade 18 need never engage the bottoms of the slots 8 nor the wood of the bottom wall 4 in order that a slice may be completely cut off the loaf.

After the knife blade 18 has been removed, then the uncut portion of the loaf is pulled back away from the wall 13 far enough that the slice will topple over by the action of gravity, the top portion of the slice following substantially the dotted line 23 as it falls over, due to its support, by means of the uncut portion of the loaf, having been removed. The slice is then in position with the cut face thereof lying flatly in engagement with the top face of the inclined bottom wall 4. The uncut body portion 24 of the loaf is then used to push the slice 25 along the top face of the wall 4 through the opening or slot 15, as shown in Fig. 3, this being continued until the flat cut face 26 of the loaf is moved into engagement with the flat face 17 of the wall 13. The slice 25 will have then dropped off the end 11 of the wall 4 and onto any suitable means for receiving the same, such as the plate 20. The cutting operation can then be repeated as described above and another slice cut off. The same procedure is then carried out in cutting off the slice and ejecting it from the device onto a receptacle therefor, as has been above described, this being repeated until the desired number of slices have been cut off.

In Fig. 2 the uncut portion 24 of the loaf is shown in position to carry out the cutting operation, the slice being shown as being partly cut off, the cut that has been made bearing the numeral 27 and being about the depth that would be reached when the knife is in the position shown in Fig. 1. In the drawing the loaf of bread illustrated is substantially the largest size loaf that can be sliced in the device, as obviously the loaf must not project above the top edges of the enlargements 7 on the walls 5 and 6, in order to enable the user thereof to engage the knife properly with the guide slots 8 before cutting of the loaf is actually started. Practically all bakers' bread is of a cross sectional size within fairly well defined limits, so that the size of the enlargements 7, and thus of the length of the slots 8 projecting above the top face of the bottom wall 4 can be determined to make a standard device that will enable the slicing of bread in uniform slices for all sizes that are normally turned out by commercial bakers. It is not only important to the appearance of the slice that the same be of uniform thickness throughout, but it is a necessity that the slices be of substantially uniform thickness throughout in order that the same can be used in what are known as "pop-up" toasters, in which the slices of bread are supported in a vertical position by a support that is released to project the slices upwardly out of the toaster when toasting is completed. If the slices vary in thickness, or are wedge shaped so that some or all portions of the slice are too thick to readily enter such a toaster, the toaster cannot be operated successfully to toast such slices of bread and the bread is wasted. While the slots 8 can be placed at any desired distance from the flat face 17 of the wall 13, it has been common practice to slice substantially all bakers' bread of a uniform standard thickness and the toasters above mentioned are made to operate with slices that are of the standard thickness that has been adopted by bakers. The fact that bakers are no longer permitted to sell sliced bread has made it necessary to provide a simple and effective means for slicing bread from the loaf in a uniform manner by the householder. This can be readily accomplished by our invention without providing any complicated apparatus and without having any moving parts that require any attention.

The opening or slot 15 is only large enough that the slice will readily pass therethrough. The major portion of the end face of the loaf from which a slice is being cut is thus braced by engagement with the flat face 17 of the wall 13 to gauge the thickness of the slice through substantially the entire slicing operation.

What we claim is:

1. In a slicing device, an elongated bottom wall having a flat top face for supporting an object to be sliced, a pair of parallel side walls extending perpendicularly to said bottom wall and elongated lengthwise of said bottom wall and a flat faced stop wall mounted in fixed position relative to said bottom and side walls and extending perpendicularly thereto, said stop wall connecting and bracing said side walls, said side walls having a single slot therein parallel to and spaced from said stop wall the thickness of a slice to be cut from said object for guiding a cutting blade parallel to the flat face thereof, said stop wall extending between said side walls over the major portion of the height thereof to provide a flat supporting face for the major portion of the end of an object being sliced, said bottom wall extending under said stop wall and the bottom edge of said stop wall being spaced sufficiently from the top face of said bottom wall to permit passage of a slice edgewise through the discharge slot thus provided, said stop wall having its flat face inclined to the vertical to locate the upper end thereof vertically above a portion of said bottom wall lying in front of said discharge slot so that a slice engaging said stop wall will have a tendency to drop away from said stop wall toward said bottom wall, said side walls and bottom wall providing a slide way for said object and cut off slice, whereby a cut off slice deposited on said bottom wall upon moving said object away from said stop wall is directed through said discharge slot longitudinally of said device by return movement of said loaf toward said stop wall.

2. In a loaf slicing device, an elongated bottom wall having a flat top face for supporting a loaf to be sliced, a pair of parallel side walls extending perpendicularly to said bottom wall and elongated lengthwise of said bottom wall and a flat faced stop wall mounted in fixed position relative to said bottom and side walls and extending perpendicularly thereto, said stop wall connecting and bracing said side walls, said side walls each having a single slot therein parallel to and spaced from said stop wall the thickness of a slice to be cut from said loaf for guiding a cutting blade parallel to the flat face thereof, said stop wall extending between said side walls over the major portion of the height thereof to provide a flat supporting face for the major portion of the end of a loaf being sliced, said bottom wall extending under said stop wall and the bottom edge of said stop wall being spaced sufficiently from the top face of said bottom wall to permit passage of a slice edgewise through the discharge slot thus provided, said stop wall having its flat face inclined to the vertical to locate the upper end thereof vertically above a portion of said bottom wall lying in front of said discharge slot so that a slice engaging said stop wall will have a tendency to drop away from said stop wall toward said bottom wall, said side walls and bottom wall providing a slide way for said loaf and cut off slice, whereby a cut off slice deposited on said bottom wall upon moving said loaf away from said stop wall is directed through said discharge slot longitudinally of said device by return movement of said loaf toward said stop wall, said bottom wall inclining upwardly toward said stop from its end remote therefrom and said side walls extending beyond said stop wall, said extension being cut away at the bottom edge portions thereof to permit said device to overlap a receptacle for said slices.

JOHN R. FUCHS.
ALFRED R. FUCHS.